Patented Aug. 28, 1928.

1,682,479

UNITED STATES PATENT OFFICE.

FREDERICK W. BROWN, OF COLUMBUS, OHIO, ASSIGNOR OF ONE-HALF TO GIDEON R. AUSTIN, OF BELLEFONTAINE, OHIO.

DOLOMITE CEMENT AND PROCESS OF PRODUCING THE SAME.

No Drawing. Application filed November 10, 1924. Serial No. 749,060.

This invention relates to the production of cement and more particularly to the production of dolomite cement.

An object of the invention is to regulate or control the method and conditions of heating or burning dolomite stone so as to yield a cement material which can be colored, dyed, or mordanted in water solutions or suspensions of dyestuffs or colors without injury, by the treatment, to the cementing efficiency of the product.

A further object is to provide an improved method of dyeing or coloring the cement powder.

A novel feature of the invention is the method of fastening the color therein.

When heated to temperatures ranging from 1000° F. to 1800° F., dolomite stone loses carbon dioxide and becomes either a magnesium cement or a magnesian lime.

Below the temperature of about 1600° F., the resultant material consists of magnesium oxide and calcium carbonate. At continued temperatures above the neighborhood of 1600° F., the resultant material becomes magnesium oxide and calcium oxide. When these oxides are treated with water, they ordinarily are converted to the bases and either a mixture of magnesium hydroxide and calcium carbonate, or of magnesium and calcium hydroxides result.

I resort to a treatment in burning that eliminates the formation of hydroxide in the treatment by water.

When the heat treatment is conducted in appropriate metal containers in such manner as to avoid protracted heating at temperatures below 1400° F., and to limit the time of heating at higher temperatures to such periods as suffices to finish liberating only that amount of carbon dioxide corresponding to the amount of magnesium carbonate present, the total period of heating being ordinarily between the limits of five to thirty minutes duration, the product is found, under normal conditions to give no reaction on being steeped in warm water and dried.

By normal conditions here is meant that no substance interfering with the desired decomposition of the dolomite shall be present, so that the decomposition may be effected in the proper manner and time.

I have found that dolomite free from ferrous compounds can be thus normally burned in silicious or clay vessels, but that the heat conductivity of these vessels is too low for efficient results.

I have found that heating in iron or steel containers is destructive to the activity and setting power of the product and also to the container.

I have found that a direct flame produces too high temperatures locally, yielding caustic lime in objectionable amount.

I have found that normal burning can be effected with most eminent success by heating in nickel or nickel alloy containers and that this metal withstands the heat exposure successfully and provides a good conductor to heat. Nickel containers are on occasion suitably alloyed to prolong their life in exposure to heat and destructive gases.

Interference with proper reaction in the heating process has been traced by me, among other things, to ferrous compounds in the dolomite or to iron scale in the furnace.

Therefore, I eliminate iron from the parts exposed to heat and oxidize any ferrous compounds present in the dolomite by roasting at moderate temperature and steaming before heating to the temperature of the critical reaction, or reject such dolomite entirely.

Suitable material burned with due regard to the requirements outlined has always consistently met every requirement for coloring, set, strength, hardness and durability. These results have been established by me through years of research.

The heating furnace required consists in a heated chamber in which the source of heat may be electrical or from fuel combustion. The furnace is maintained at any desired temperature between 1400° F. and 1800° F.

Inserted into and passing through the chamber are one or more tubular or rectangular compartments or retorts, fixed or movable, to contain the material while being conveyed through the chamber. The material may be conveyed by motion of the containers or by conveyors passing through the same. All material of the heating chamber must be such as has no catalytic effect during the burning process, preferably brick work, composed of silica and alumina or of magnesia. The container compartments are made of nickel or nickel alloy. Conveying apparatus is of nickel or alloy throughout. The heat of the used gases may be recovered as with other heating furnaces.

The product properly burned and ground is inert to the action of pure water within a period of time much greater than is required for the processes of filtering and drying after dyeing or coloring is effected.

Dyeing as here used is a term usually applied in the coloring of textiles, but in my method, is employed because dyes are used on the same principles, in large degree, as in textile coloring. The term coloring here applies more aptly to use of mineral colors, as distinguished from dyestuffs of organic or artificial origin. It might appear that the term "dyeing" could have no correct use in case of material other than textiles, but on the merits of the case, it is evident it has a place here. The dyes are dissolved in water of the desired temperature, with or without mordanting or dyeing assistants, as a dye may require, and the cement powder is added in amount suitable to consume the amount of dye present so estimated as to give a desired shade. Or again, a super-charged dye solution may be made and such an amount of cement powder be introduced that the cement is fully saturated with dye. The amount of dye a given weight of cement will adsorb depends in part on the fineness of the cement, and if the capacity of adsorption or the amount of cement exposed be great enough, all the dye will be removed from the water solution.

Whether the cement forms a mordanting principle and combines with the dyestuff to form a color lake, or whether there is a simple colloidal adsorption of the dyestuff by the cement is immaterial, as the dyeing effect and the resulting color is the same.

The colored cement powder is next separated from the residual liquor or dye water by sedimentation, filtering, drying or any combination of means desired. The dry cement is ready for packing and shipment.

It here must be noted that if in the burning of the cement, calcium oxide be produced, it will interfere with the dyeing, not only because of its alkaline reaction, but because in slaking, it will cause decomposition of the cement. If the magnesium component be improperly burned, it also may form a base in sufficient amount to cause disintegration and failure. Only the strictest adherence to the conditions and method herein provided for proper burning will permit of full success.

It must be noted too that mineral pigments, by emulsion or colloidal suspension in water, are also employed to color the cement by the same procedure as with dyestuffs. Stains may also be applied or developed from water solutions.

The colored cement powder is however not perfected or the cement completed until the dye or color be rendered fast, i. e., unless the cement be set with the use of an agent which protects the dye from caustic action, from solubility and from the destructive effects of frost and light, during gauging of the mortar in addition to protecting the dye during and after hardening. The setting of the cement may be conveniently effected by various agents, among which are salts of suitable solution density, capable of both electrolytic and hydrolytic disassociation. I employ magnesium chloride dissolved in the water of gauging the mortar. This material is of long standing use in connection with magnesium cements, and in so called sorel cement whether the same be derived from magnesium or dolomitic stone. I maintain, however, that magnesian and sorel cements as heretofore burned and prepared are subject to deterioration of their cementing value by exposure to moisture and by ageing, resulting from decomposition accompanying hydration or other impairment of their structure, from which my product is immune.

By this I mean that if magnesian or sorel cement powder as usually prepared, is subjected to moisture, as for example by exposing the bags of cement to rain, it will be found that after the cement has been dried, it has been injured by the exposure to moisture, whereas my cement if subjected to the same conditions, will be found to be uninjured. Because of the injury resulting from exposing magnesian or sorel cement powder to moisture, it is common practice for cement dealers and shippers to take every precaution to keep the cement dry until it is disposed of. I believe that decomposition of this cement powder is effected by acid radicals set free by the action of hydrolysis or of electrolytic disassociation and that these radicals are continuously displaced by association of the magnesia with hydroxyl radicals by substitution until the whole mass becomes a hardened hydraulic cement. I hold that such a cement is entirely distinct from sorel cements and belongs solely in the category of hydraulic cements.

But, whatever the action of the setting agent may be, or however the cement be classified, I make no claim as to a hardening or setting agent. I merely take cognizance that it is used as a setting agent for dolomitic cement.

I adapt and adopt this material for my purpose as a part of the cement, exclusively because thereby I render the great class of coal tar dyes, as well as many others, completely insoluble in water and protect the color from caustic action when the bases associated with setting action are formed, and preserve the color of the set cement from the decomposing effects of light. The surface may become tarnished with soot, dust or grime incident to age or exposure, but at any time this may be removed by a dilute acid wash, and the color be again revealed in its original hue.

A typical embodiment of the method is as follows:

The suitable dolomite stone is crushed and pulverized to a size of grain suitable for treatment in the apparatus. It may be finally pulverized to a powder either before or after the burning, as found more convenient or efficient. If it contains ferrous carbonate, it is moderately heated to expel the carbon dioxide and steamed to convert the iron to the ferric form. Dolomites containing silicates will not do. The presence of asbestos for instance, deranges the reactions in burning. Often a stone classed as dolomite by analysis is not a true dolomite. The action of a suitable dolomite is often determined by the nature of its derivation. Differing dolomites require differing temperatures in burning. The prepared dolomite is introduced in a continuous and regulated stream into the conveying apparatus of the heated container, entering the heated chamber of the furnace at one side and discharging at the opposite side for cooling. On entering the furnace, it is brought immediately or as rapidly as practicable into the full heat of the furnace and the temperature of the entering mass is brought to its maximum as quickly as possible. This material is amenable to the influences of heat treatment, to catalysis and apparently to magnetic action of some kind, hence these features are important.

The speed of passage through the heated chamber is regulated by the speed of the conveyor so as to discharge in a regulated time. The temperature of the furnace is under accurate control. As the material emerges from the furnace, it is sampled as found desirable and analysis is made ascertaining the amount of carbon dioxid remaining and thereby showing the correct amount expelled, which being known, the speed of passage is corrected, if need be, to conform to the desired amount, i. e., to such amount as the magnesium carbonate contained.

During the heating operation, the containers in which the cold dolmite is placed are introduced into the end of the heating chamber at which the temperature is highest and as the material proceeds toward the exit, it approaches the maximum heat and the furnace approaches its minimum temperature. At the outlet end, the heat of the furnace is about 1600° F., and the material is heated to about this temperature. The material is not maintained at such temperature for any appreciable length of time but only reaches the maximum temperature just before it is delivered from the furnace. The temperature rise from normal to substantially 1400° F. is rapid and regular, and the removal of carbon dioxide is slow and uniform. At about 1400° F., a critical temperature is reached and the gas is rapidly expelled. At this point, the rise in temperature is checked until substantially all the carbon dioxid of the magnesium carbonate is expelled without much increase in temperature. From this point, there is a continual rise in temperature to substantially 1600° F., during which the remainder of the carbon dioxid in the magnesium carbonate is slowly expelled.

The correct residual carbon dioxid will be ordinarily between the limits of 27 to 33 per cent, depending on the original content of magnesium carbonate.

The temperature of the heated chamber is preferably around 1600° F. The time of passage for the material is preferably about 15 minutes.

For the successful accomplishment of the described treatment, the containers through the heated chamber are made of nickel or suitable nickel alloy. This material is the only wholly suitable available substance thus far known having the desired conductivity for heat and the necessary strength and permanence at the temperature employed, combined with the necessary adaption to effect the chemical and metallurgical reactions desired.

The containers or conveyors herein provided may be of nickel alloyed with material extending the range of temperature employable to such extent as may be found not to vitiate the value of the cement, and other cement than the variety here specified may be improved by the use of this equipment.

The cooled and finally powdered product is then introduced in appropriate quantity into an agitator containing the desired water solution or suspension of coloring substance. The substance may be a natural organic or an artificial dyestuff, a mineral color, or a staining substance.

The cement powder, properly prepared as directed, will be unaffected by the water of the bath, so far as its cementing power is concerned, but will absorb or adsorb the dye or color and remove it from the bath. When the adsorption is complete, the cement powder containing the color is removed from the bath, by filtering, or sedimentation or otherwise, as desired, and dried. It may be further pulverized if required. In handling and govering the action of the dyes, many of the arts employed in coloring textiles may be employed.

The cement powder is now ready to be used. It must be used, however, with a setting agent capable of preserving and rendering the colors insoluble and immune to the effect of frost and light and the alkaline reaction of the bases formed in the setting of the cement. For this purpose, the water employed in gauging the cement mortar is impregnated with about 25 per cent of its weight of magnesium chloride, which may be a salt mixed with the cement,—or the water may be previously brought to such strength of brine as will test about 20° Baumé, the allowable range being 16° Baumé to 24° Baumé. To this cement putty, so gauged, may be added such fibering materials or aggregate as desired.

The cement powder calcined as described may be treated as stated, with magnesium chloride. This may be added as obtained as a commercial product on the market.

I provide however for its preparation as a part of the cement itself, as follows: A given weight of the calcined cement powder is taken and one-sixth of this amount is taken out  fore the cement powder is treated for     ng. This separate portion together    seven-tenths of its weight of calcium chloride is placed in water, forming a milk or cream emulsion. This is placed in a closed vessel with a small addition of ammonia, water and alcohol, and agitated, cold, while carbon dioxide gas, derived preferably from the calcining furnaces, is passed through the emulsion, until the insoluble residue shows a practically complete extraction of the magnesia by the brine. The residue is filtered off and the liquid obtained is boiled to dryness, or to such concentration as desired. The evaporated residue is then incorporated with the cement body from which it was originally taken after the coloring and drying is complete; or the concentrated liquid may be used in gauging the said cement to mortar. The cement powder to be thus extracted is preferably ground very fine and air separation from the same is desirably employed.

While I have described in detail the preferred practice of my process, it is to be understood that the details of procedure may be varied without departing from the spirit of the invention or the scope of the subjoined claims.

I claim:

1. The herein described process which comprises heating dolomite substantially free from iron and silica by a rapid rise in temperature to substantially 1400° F., continuing to heat the dolomite to a temperature approximating 1600° F., for a period sufficient to calcine and hold the magnesium oxide content in combination with, yet insufficient to calcine the calcium content and dyeing the resulting product in a water bath.

2. The herein described process which comprises heating dolomite substantially free from iron and silica by rapidly raising the temperature to avoid the formation of free basic magnesium oxide, continuing to heat the dolomite at a temperature below but approximating 1600° F., to further calcine the magnesium content and form magnesium oxide inert to water in the presence of calcium carbonate and dyeing the resulting product in a water bath.

3. The herein described process which comprises heating dolomite substantially free from iron and silica by rapidly raising the temperature to avoid the formation of free basic magnesium oxide, continuing to heat the dolomite at a temperature below but approximating 1600° F., to further calcine the magnesium content and form magnesium oxide inert to water in the presence of calcium carbonate, dyeing the resulting product in a water bath and subsequently gauging the material with water containing magnesium chloride.

4. The herein described process which comprises subjecting a dolomite cement having its magnesium oxid content combined with calcium carbonate, to a water emulsion of a coloring material, drying the colored cement powder, and gauging it with water containing magnesium chloride.

In testimony whereof, I affix my signature.

FREDERICK W. BROWN.

CERTIFICATE OF CORRECTION.

Patent No. 1,682,479. Granted August 28, 1928, to

FREDERICK W. BROWN.

It is hereby certified that the name of the assignee of one-half interest in the above numbered patent was erroneously written and printed as "Gideon R. Austin," whereas said name should have been written and printed as "Gideon L. Austin", as shown by the records of assignments in this office; and that the said Letters Patent should be read with this correction therein that the same may conform to the record of the case in the Patent Office.

Signed and sealed this 9th day of October, A. D. 1928.

(Seal)

M. J. Moore,
Acting Commissioner of Patents.